No. 642,120. Patented Jan. 30, 1900.
G. B. HIETT.
SEPARATING AND CONDENSING DEVICE FOR AMMONIA SUCTION.
(Application filed Feb. 15, 1899.)
(No Model.) 2 Sheets—Sheet 1.
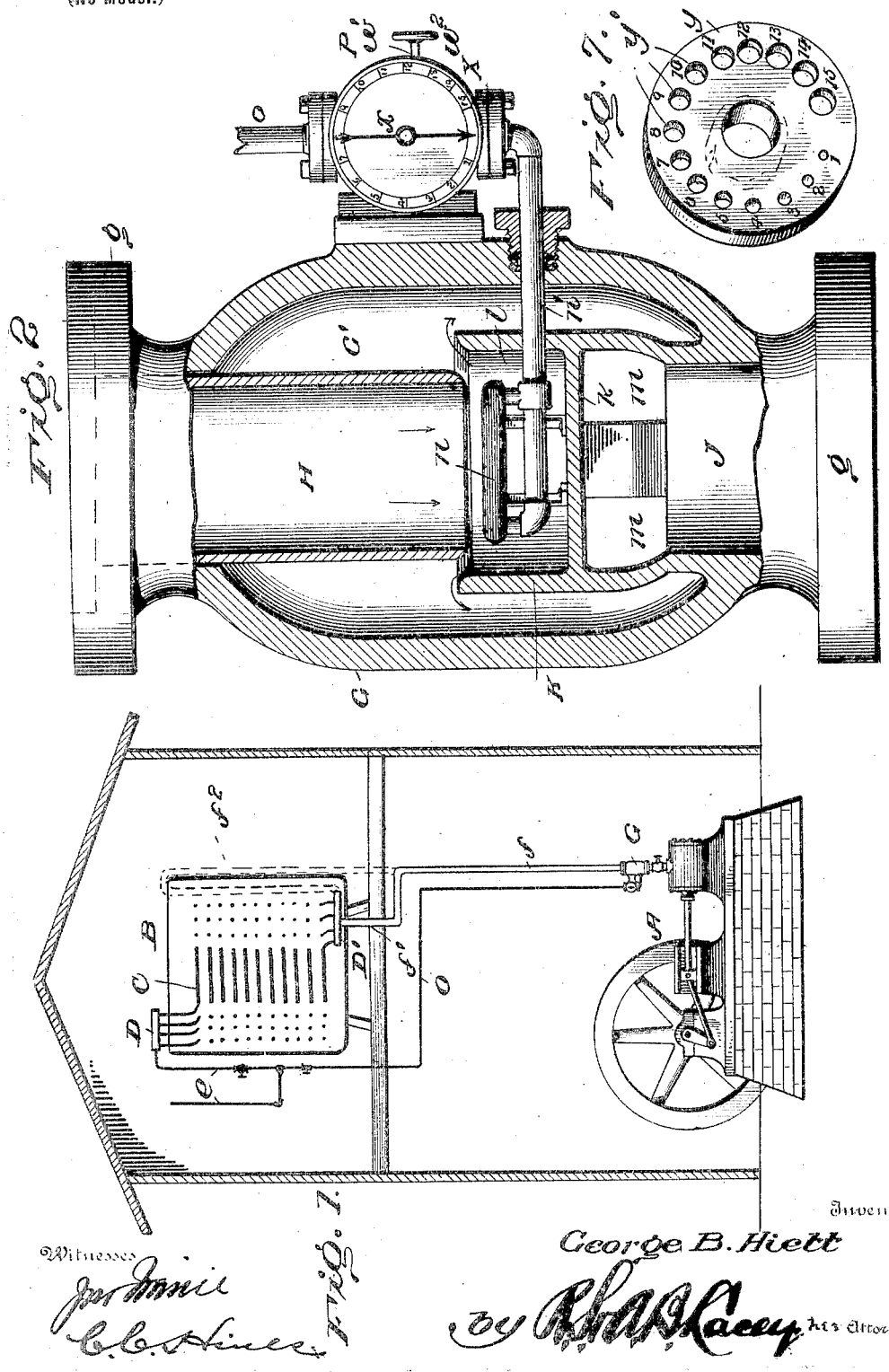
Witnesses
Inventor
George B. Hiett
by Lacey, his Attorney No. 642,120. Patented Jan. 30, 1900.
G. B. HIETT.
SEPARATING AND CONDENSING DEVICE FOR AMMONIA SUCTION.
(Application filed Feb. 15, 1899.)
(No Model.) 2 Sheets—Sheet 2.
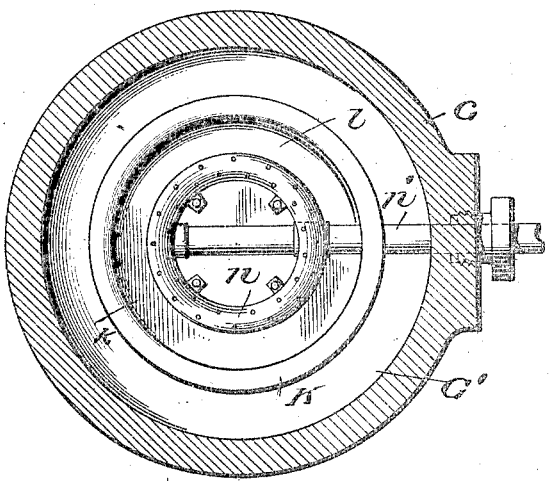
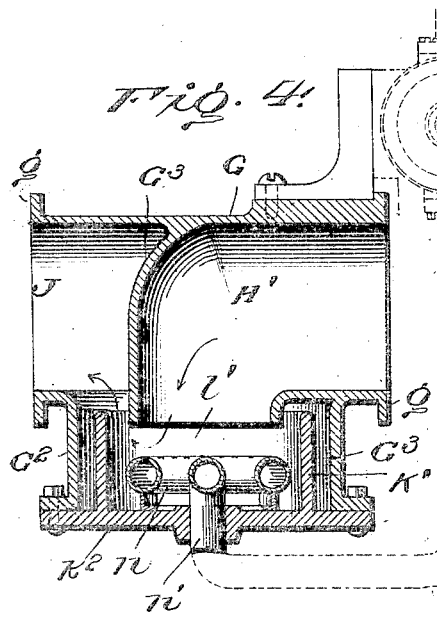
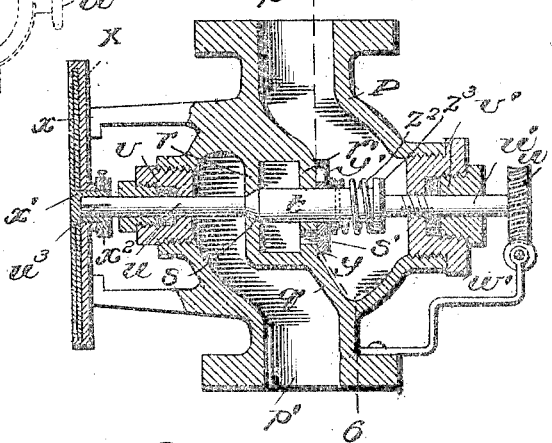
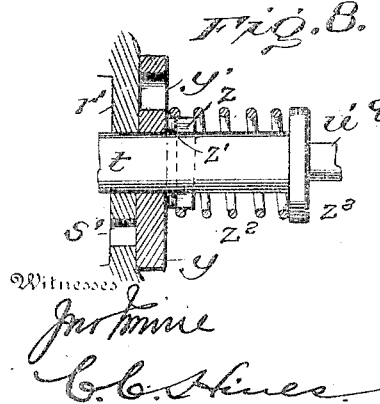
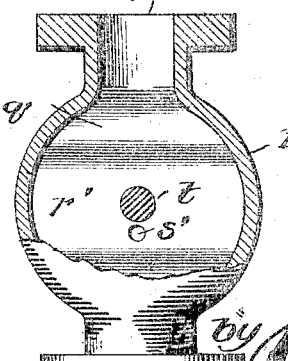
Witnesses
Inventor
George B. Hiett

UNITED STATES PATENT OFFICE.

GEORGE B. HIETT, OF ATLANTA, GEORGIA, ASSIGNOR OF ONE-HALF TO SAMUEL L. BREWER, OF TUSKEGEE, ALABAMA.

SEPARATING AND CONDENSING DEVICE FOR AMMONIA SUCTION.

SPECIFICATION forming part of Letters Patent No. 642,120, dated January 30, 1900.

Application filed February 15, 1899. Serial No. 705,544. (No model.)

*To all whom it may concern:*

Be it known that I, GEORGE B. HIETT, a citizen of the United States, residing at Atlanta, in the county of Fulton and State of Georgia, have invented certain new and useful Improvements in Separating and Condensing Devices for Ammonia-Suction Pipes; and I do hereby declare the following to be a full, clear, and exact description of the invention, such as will enable others skilled in the art to which it appertains to make and use the same.

This invention relates to improvements in ice-making and refrigerating machines of that class employing as a refrigerating agent a volatile liquid, such as anhydrous ammonia, liquefiable under mechanical compression, the expansion of the liquid and consequent absorption of heat thereby being utilized for cold production. Machines of this character operate under two systems—namely, the "dry" or "hot" gas system and the "cold" or "humid" gas system. In the dry-gas system the greater portion of ammonia entering the compressor-cylinder is gaseous and the temperature becomes by compression several hundred degrees greater than the boiling-point, due to condenser-pressure, resulting in the superheating of the gas and consequent loss of motive power, so that difficulty is often found in cooling the gas in the condenser and a water-jacket is required to keep the cylinder cool enough to prevent injury to the packing and other vulnerable parts, whereby the machine is encumbered and the cost of manufacturing and operating the same increased. In the cold or humid system of compression these objections are to a great extent overcome, as some of the ammonia entering the compressor-cylinder is liquid, so that a large amount of the heat developed is absorbed by the liquid which expands into a vapor, and the temperature of the ammonia is thereby confined to a relatively low point and less water on the condenser is required to cool the same than in dry-gas machines. This is accomplished by letting an excess amount of liquid ammonia into the refrigerating or expansion coils, so that expansion will ensue throughout the entire length of suction-pipe to the cylinder, whereby the ammonia enters the cylinder in the form of a saturated gas, the liquid portion of which expands and absorbs the heat developed.

In both types of machines the compressors are invariably driven by direct mechanical connections from a crank-shaft, and owing to the fact that the piston makes a complete stroke at each half-revolution of the crank-shaft great care is taken to prevent gorging or flooding of the cylinder with liquid, for the reason that knocking out of the cylinder-head or breaking of the weaker parts of the pump is apt to occur, as the piston travels faster than the liquid can be expelled. In dry-gas machines wherein the pumps are built for very high speed and to handle gas only every precaution is taken to prevent the inlet of an undue amount of liquid to the cylinder, the pumps being elevated in some instances to a considerable height above the plane of the refrigerator. Humid-gas machines are generally run at a lower rate of speed than dry-gas machines, but are designed to handle a certain proportion of gas and liquid only, and great care is also taken therein to prevent the admission of ammonia to the compressor-cylinders in a complete liquid state.

In both systems where the refrigerating-coils are arranged in or above the plane of the pumps the suction-pipes are extended up from the bottom headers of the coils and then back overhead to the pumps to prevent the flow of a "slug" or solid mass of matter composed of liquid ammonia, oil, foul gas and air, scale, and other residuum, or the rush of liquid ammonia alone to the pumps. The effect of the elevation of the suction-pipe is to cause the retention in the lower headers of the liquid ammonia condensing in the coils, together with the waste oil, scale, and other foreign substances, which are carried along with the ammonia. These liquids and solid foreign substances accumulate in the headers and back up into the refrigerating-coils until the pressure of the incoming gas is sufficient to expel them, when they are scattered and blown out into the suction-pipe in the form of a mist or spray after the manner of an "air-lift" in wells. By this means the passage of any large bodies of liquids and solids into the suction-pipe is avoided under ordinary conditions, although at all times a small amount of liquid is avoidably carried along by the expanding gas to the pumps. This result is, however, secured at the expense of a material loss in the refrigerating effect, owing to the obstruction of the coils and resistance opposed to the free flow and expansion of the entering ammonia by the liquids and residuum, to the partial absorption of ammonia by said liquids and residuum, and to the presence of oil and other poor conductors of heat carried through the system. Moreover, the accumulation of oil at this point is an additional source of trouble, since it becomes easily stiffened when stagnant by contact with the expanding gases and adheres to the coils, so that it can only be removed by blowing out the pipes with steam or hot gases. Notwithstanding the elevation of the pumps and suction-pipes and the use of various agitating devices, however, flooding or gorging of the pump-cylinders cannot be avoided when a large number of expansion-coils with a single ammonia feed are employed, for the reason that the circulation is freer through the inner or shorter coils than through the outer or longer coils, so that while the pressure of the ammonia-gas in the short coils is sufficient to keep the same clear of obstructing substances the correspondingly-decreasing pressure of the gas in the longer coils is not always sufficient to prevent the liquids and foreign substances from accumulating therein until the flow of gas is nearly if not completely arrested. This mass of matter being too heavy for the gas to blow through it remains until the pressure of the gas is sufficient to lift it out in a body into the suction-pipe, through which it is quickly forced by the expanding gas behind it to the pumps. In this case knocking out of a cylinder-head or breaking of the crank-shaft is unavoidable. Owing to the obstruction to the flow and expansion of the gas through the coils above pointed out difficulty has also been found in getting the return gas to the pumps in machines acting on the cold or humid system of compression, particularly when the refrigerator is located at some distance from the pumps, and this is a vital objection, since the expansion of the gas is depended upon solely to keep the cylinders cool. At such times it is necessary to cool the cylinders by artificial means, as by packing ice in a box or casing inclosing the cylinder, to prevent serious injury to the vulnerable parts until the return gas is received.

The object of this invention is to provide a separating and condensing device for attachment to the suction-pipes of both dry and humid gas machines, whereby the compressor will be kept cool at all times without the use of water-jackets and oil seals and without the necessity of rushing the ammonia through the refrigerating-coils thereto, the entering ammonia, if in a gaseous state, cooled and reduced in volume, so that a larger amount of ammonia will be compressed at each working-stroke of the piston and all large bodies of liquids scattered and the volatile elements thereof converted into vapor before entering the compressor-cylinder to prevent injury thereto.

A further object of the invention is to provide a device such as described, which will permit of the suction-pipe being connected directly to the bottom header of the coils, so that all liquids and foreign substances will be quickly conducted therefrom and the objections heretofore pointed out to the elevation of the pipe avoided.

With these and other minor objects in view the invention consists of the features of construction and combination of parts which will be hereinafter more fully described, and particularly pointed out in the annexed claims, reference being had to the accompanying drawings, forming a part of this specification, and in which—

Figure 1 is an elevational view of the refrigerator, compressor, and connecting pipes of a refrigerating and ice-making machine, showing the application of the invention to the suction-pipe thereof. Fig. 2 is a vertical longitudinal section of the invention on an enlarged scale. Fig. 3 is a horizontal section thereof on line 3 3 of Fig. 2. Fig. 4 is a vertical longitudinal section of a modified form of device adapted for application to suction-pipes extending horizontally to the compressor. Fig. 5 is a vertical longitudinal section of the valve. Fig. 6 is a cross-section of the same on line 6 6 of Fig. 5. Fig. 7 is a detail perspective view of the rotary feed plate or disk. Fig. 8 is a detail sectional view of a portion of the valve stem and disk.

Referring now more particularly to the drawings, wherein like letters of reference designate corresponding parts throughout the several views, A represents the compression-pump; B, the refrigerator, shown in the present instance in the form of a freezing-tank arranged above the pump and containing a series of expansion-coils C, connected at top and bottom by manifolds or "headers" D and D'; e, the liquid-ammonia-supply pipe leading directly from a condenser or from a liquid-ammonia receptacle (not shown) to the header D, and f, the suction-pipe through which the ammonia flows from the coils to the pump. These parts may be constructed and arranged in any of the well-known ways for ice-making and refrigerating purposes as carried out under the brine system or direct-expansion system.

In carrying my invention into practice for application to suction-pipes extending vertically at their point of connection to the compression-pump I employ a case or chamber G, which is inserted in the line of the suction-pipe adjacent to the pump and is open at both ends and provided with flanges g for connection with corresponding flanges on the adjoining ends of said pipe, gaskets being interposed between the parts to form a gas and liquid tight joint. The flange at the upper end of the casing is countersunk to receive the flange on the upper end of an inlet-tube H, which lies flush therewith, so that the packing ring or gasket applied between the said upper flange of the casing and suction-pipe will also serve to prevent any escape of gas between the tube and casing, and this tube is removably fitted in the inlet-opening of the casing and projects downwardly into the separating and condensing chamber G' formed thereby. Extending upwardly from the bottom portion of the chamber in line with the discharge-opening J at the lower end thereof is an annular shield or deflector K, which is of relatively greater diameter than the inlet-tube, but of correspondingly smaller diameter than the casing, so that the chamber G' will be of sufficient area to allow for the free flow and circulation of the ammoniacal gases and liquids passing therethrough. This shield or deflector is provided with a partition or diaphragm $k$, forming the bottom of a cup-shaped pocket or trap $l$, which surrounds the lower extremity of the inlet-tube and a series of ports or passages $m$ below said pocket and communicating with the discharge-opening. It will thus be seen that the inlet-tube and pocket or trap together form an interior chamber, which is in communication with the expansion-chamber G' through the annular space, port, or passage formed at the meeting ends of said parts by making the trap of greater diameter than the tube. In this trap, which constitutes the base or lower end of the interior chamber, is inclosed a sprayer or injector $n$ in the form of a ring having a plurality of perforations or feed-orifices arranged immediately below the inlet-tube and in communication with a pipe $n'$, projecting through the walls of the pocket and casing G to the exterior. This pipe serves as the delivery end of a liquid-ammonia-supply pipe $o$, tapped into the pipe $e$, leading from the condenser, whereby the ammonia is conveyed to the sprayer, and thereby divided up and injected into the condensing-chamber in a plurality of streams to saturate and cool, and thus diminish the volume of the dry gases entering through the inlet-pipe, and the sprayer serves also as an auxiliary deflecting-surface acting in conjunction with the annular deflector to break up and scatter any liquids passing through the suction-pipe and cause the expansion of the liquid ammonia mingled therewith into vapor, in the manner hereinafter described. By injecting the ammonia into the casing in this manner a thorough and effectual saturation of the entering gases takes place, as the entire amount injected is placed in condition to quickly expand and absorb the heat and intimately combine with the gases.

The feed of ammonia to the separating and condensing chamber may be regulated by an expansion-valve of ordinary construction, if desired; but I preferably employ the form of valve shown in the drawings, which has been devised especially for use in connection with the device in order that the feed of ammonia thereto may be controlled with certainty and a proper proportion injected according to the density of the gas passing from the expansion-coils to the pump, which may be determined by the presence or absence of frost on the condenser-casing. This valve device may vary in details of construction, but as illustrated comprises a casing P, suitably connected to the chamber G and to the proximal ends of the pipes $e$ and $o$ and having inlet and discharge passages $p$ and $p'$, which are respectively in direct communication with said pipes. These passages are separated by a partition $q$, chambered at or about its center to form two independent seats $r$ and $r'$, the former having a port $s$ and the latter a port $s'$. The port $s$ is controlled by a plug-valve $t$, which projects through an opening in the wall $r'$ and is mounted to slide and turn freely therein, and projecting from the opposite ends of this valve are stems $u$ and $u'$, extending to the exterior through stuffing-boxes $v$ and $v'$ in the front and back walls of the casing. On the stem $u'$ are male threads $u^2$, which engage with corresponding female threads in the gland of the stuffing-box $v'$, and fitted upon the outer squared end of said stem is a worm-wheel $w$, with which engages a worm-shaft $w'$, provided with a hand-wheel $w^2$, by which the stem may be turned to move the valve in or out, and thus close or open the port, the screw-threads being of proper length and pitch to allow the valve to have one complete revolution and at the same time sufficient longitudinal movement to open wide the port when it is desired to allow the liquid ammonia to feed quickly and freely to the separating and condensing chamber. Supported by arms projecting from the front of the valve-casing is a dial-casing X, the face of which bears a series of numerals ranging in the present instance from "0" to "16." The hand or pointer $x$ of this dial is formed with a socket $x'$, which is preferably square in cross-section and is secured in position by a collar $x^2$, and fitted in said socket is the square extremity $u^3$ of the valve-stem $u$, whereby the hand or pointer is mounted to turn with the valve. The squared end of the stem is free to slide in the socket to accommodate for the longitudinal movement of the valve, but positively connects the valve and pointer, so that the latter will be turned to indicate the extent of axial movement of the valve. The port $s'$ in the valve-wall $r'$ is controlled by a rotary feed plate or disk $y$, mounted on the rear end of the valve $t$ and provided with a series of graduated openings $y'$, corresponding in number to the figures on the dial, and this plate has a clutch connection with the plug-valve, which permits the latter to have independent longitudinal movement while causing both to turn in unison, said clutch connection being constructed as follows: The plate is provided on its outer face with a hub or sleeve $z$, slotted at diametrically opposite sides for passage of the ends of a pin $z'$ passed through the valve, and is held firmly pressed against the said seat $r'$ by a spiral spring $z^2$, encompassing the valve between the disk and a fixed collar $z^3$, formed on the outer end of said valve. By this construction the feed-plate is caused to turn with the plug-valve by the pin bearing against the slotted hub thereof, while the pin is adapted to slide freely in the slots to compensate for the longitudinal movement of said valve. From the foregoing description it will be readily seen that when the hand-wheel is turned to rotate the feed-disk to bring either one of its openings into coincidence with the port $s'$ the plug-valve will be moved longitudinally to the proper extent to proportionately regulate the size of the port $s$, and that by employing a feed-plate of the construction set forth the feed of liquid ammonia to the spraying-ring may be regulated as desired, according to the state of the gas passing through the suction-pipe and the amount of liquid ammonia required for saturation. The object in employing the plug-valve is to prevent the inlet of any ammonia which may leak past the feed-plate, and thereby avoid the feed of an excess amount, which would be objectionable at periods when the gas is passing through the suction-pipe in a liquid or densely-saturated state. When it is desired to feed through any particular opening in the feed-plate, it is simply necessary to turn the hand-wheel until the hand or pointer registers with the corresponding number on the dial-face, whereupon the opening will be brought into coincidence with the port $s'$, and by this means the amount of liquid ammonia being sprayed into the separating and condensing chamber may be ascertained at any time.

In Fig. 4 I have shown the separating and condensing device adapted for application to suction-pipes extending horizontally to the compression-pump. In this construction the inlet pipe or tube $H'$ is formed integrally with the casing and projects vertically down into the lower portion of the chamber $G'$, which is formed by a depending annular wall $G^2$, closed at bottom by a plate or head $K^2$. This head takes the place of the partition or diaphragm shown in the vertical condenser and serves as the bottom of the pocket or trap $l'$, which is formed by an integral annular wall $K'$, rising from said head and inclosing the lower extremity of the inlet-pipe. Access to the casing in this instance may be had by simply detaching the head and pipe $n'$.

In practice the liquid ammonia fed to the spraying-ring is injected into the pocket or trap, condensing-chamber, and lower portion of the inlet tube or pipe in the form of a mist or spray which expands and circulates therein and then passes out through the discharge-opening to the cylinder of the compressor, where its expansive property is utilized to absorb the heat developed, and thereby keep the cylinder, piston, and component parts of the compressor cool. This operation is continued during the entire action of the compressor, and the result is that the compressor is maintained at a low temperature, whether any return gas is being received or not, the use of water-jackets, oil seals, and other foreign lubricating and cooling agents avoided, and excessive superheating of the ammonia during the period of compression prevented. When the ammonia passing through the suction-pipe on its way from the expansion-coils to the compressor is in a gaseous or vaporous state, it is checked by the annular deflector and caused to circulate throughout the condensing-chamber, so that it will be thoroughly commingled with the atomized liquid ammonia preliminary to its entrance into the cylinder. On coming in contact with the dry gas the liquid ammonia expands and absorbs the heat and reduces the volume thereof, and this expanding and absorbing action continues during the flow of the gas from the condensing-chamber into the compressor-cylinder, whereby the gas enters said cylinder in a saturated state and drenches the suction-valves, cylinder-walls, piston, and piston-rods and takes up the heat developed in the most effective manner. All liquid bodies flowing through the suction-pipe dash forcibly against the spraying-ring and partition or diaphragm of the deflector and are thereby scattered and broken up, the violent agitation set up by the contact of the liquids with the deflector and the sloshing action of the same against the inlet-pipe and walls of the condensing-chamber, as well as the suction action of the piston, causing the conversion of any liquid ammonia which may be contained therein into vapor. This vapor passes out into the compressor-cylinder, while the non-volatile elements—such as oil, scale, and other foreign substances—fall back into the trap or cup or down to the bottom portion of the condensing-chamber, where they remain until the liquid particles reach the level of the spraying-ring and discharge-ports, when they are gradually blown out by the atomized liquid ammonia and entering gas. The solid particles which are not blown out may be removed whenever desired by detaching the inlet tube or pipe in the construction shown in Figs. 1 to 3 and the bottom plate and delivery portion of the ammonia-supply pipe in the construction shown in Fig. 4. By this means the passage of any bodies of liquids into the compressor-cylinder sufficiently large to cause injury to the compressor is prevented, and I am thereby enabled to connect the inlet end of the suction-pipe directly to the bottom header $D'$ of the expansion-coils, as shown at $f'$ in Fig. 1, instead of elevating the pipe in the usual manner, as indicated at $f^2$ in broken lines in said figure, to avoid the objections to the elevation of the pipe hereinbefore set forth. By connecting the suction-pipe directly with said bottom header also choking of the separating and condensing chamber cannot occur, as, owing to the fact that the liquids flow out of the header as fast as they are received from the coils, only a small quantity passes through the condensing-chamber at a time.

I am aware that it has heretofore been proposed to employ an injector for spraying liquid ammonia directly into the cylinder or gas-chamber of the compressor for the purpose of cooling the same; but it has been found in practice that this has no beneficial effect and results only in a loss of the refrigerating agent, since the ammonia is expelled by the rapid action of the piston before full expansion and absorption of heat and any material reduction in temperature take place. Moreover, the injection of ammonia directly into the cylinder would be of no advantage in cooling the suction-valves in the heads of double-acting compressors acting on the "cold" or "humid" system of compression nor in reducing the volume of the entering gas in compressors acting on the "dry" or "hot" system of compression. My invention provides, on the contrary, a simple and effective form of device which serves the dual function of injecting a cooling agent where a thorough saturation and reduction in volume of the dry gas takes place before it enters the cylinder and the full expansive property of the ammonia then utilized for cooling the cylinder and of breaking up and scattering all large bodies of liquids, so that the suction-pipe may be connected directly with the bottom header of the expansion-coils and injury to the cylinder and obstruction of said coils prevented.

It will be understood that the invention is not limited to the exact features of construction and arrangement set forth as constituting its preferred form, but that these may be modified in certain respects as circumstances or the judgment of those skilled in the art may dictate without departing from the essential features of the invention.

I do not in this application claim the process of cooling the cylinders of compressors for refrigerating apparatus as herein disclosed, as such process is an independent invention and forms the subject of a separate application, Serial No. 738,875, filed by me on December 1, 1899, in accordance with the requirements of the rules of practice now in force.

Having thus described the invention, what is claimed as new is—

1. In an ice-making or refrigerating apparatus, the combination, with a compressor-cylinder and its suction-pipe, of a casing connected with said pipe and having inlet and discharge ports, an expansion-chamber in communication with the discharge-port, an interior chamber in communication with the inlet-port and expansion-chamber, an injecting device located in said interior chamber, and a supply-pipe independent of or auxiliary to the suction-pipe, for conveying a volatile liquid to said injecting device.

2. In an ice-making or refrigerating apparatus, the combination, with a compressor-cylinder and its suction-pipe, of a casing arranged in said pipe and having a deflector located between its inlet and discharge ports, an inlet pipe or tube leading from the inlet end of the casing to said deflector, an injecting device located in proximity to the meeting ends of the deflector and pipe, a supply-pipe leading through the wall of the casing to said injecting device, and a valve in the supply-pipe.

3. In an ice-making or refrigerating apparatus, the combination, with a compressor-cylinder and its suction-pipe, of a casing arranged in said pipe and having a deflector projecting from its discharge end and having ports in communication therewith, and a pendent tube removably fitted in the inlet end of the casing and leading to said deflector.

4. In an ice-making or refrigerating apparatus, the combination, with a compressor and its suction-pipe, of a casing arranged in said pipe and having an expansion-chamber, a deflector forming a pocket or trap, and an inlet-tube leading into said trap.

5. In an ice-making or refrigerating apparatus, the combination, with a compressor and its suction-pipe, of a casing arranged in said pipe, said casing having a deflector forming a pocket or trap and an inlet-tube leading to the trap, one of said parts being removable for access to the casing.

6. In an ice-making or refrigerating apparatus, the combination, with a compressor and its suction-pipe, of a casing arranged in said pipe and having a deflector and an inlet-tube leading thereto, said deflector and tube being of relatively smaller diameter than the casing to form an intermediate expansion-chamber.

7. In an ice-making or refrigerating apparatus, the combination, with a compressor and its suction-pipe, of a casing removably applied in said pipe and provided with a deflector and a removable inlet-tube leading thereto.

8. In an ice-making or refrigerating apparatus, the combination, with a compressor and its suction-pipe, of a casing having an interior annular deflector rising from its discharge end and having a diaphragm forming a cup-like trap or pocket and discharge-ports below said diaphragm, and a pendent inlet-pipe projecting down into the mouth of the pocket, said deflector and tube being of relatively less diameter than the casing and forming an intermediate expansion-chamber.

9. In an ice-making or refrigerating apparatus, the combination, with a compressor and its suction-pipe, of a casing arranged in said pipe and having a deflector, a sprayer supported by the deflector, and an inlet-pipe for conducting the entering gases and liquids directly to said deflector and sprayer before entering the body of the chamber.

10. In an ice-making or refrigerating apparatus, the combination, with a compressor-cylinder and its suction-pipe, of a casing applied in the pipe and having a deflector arranged to form a pocket or trap located between its inlet and discharge ports, a pendent inlet pipe or tube extending from the inlet end of the casing into the mouth of said pocket, a spraying device arranged in the pocket, a supply-pipe leading through the wall of the casing to said spraying device, and a valve in the supply-pipe.

11. In a refrigerating or ice-making apparatus, the combination, with a compressor-cylinder and its suction-pipe, of a device for injecting a volatile liquid, such as anhydrous ammonia, into said pipe, a supply-pipe leading to the injecting device, and a valve arranged in the supply-pipe and comprising a casing having inlet and discharge passages separated by a partition provided with a port, a rotary disk having a plurality of feed-openings either one of which is adapted to be brought into coincidence with the port by turning the disk, and means for operating the disk from the exterior of the casing.

12. In a refrigerating or ice-making apparatus, the combination, with a compressor-cylinder and its suction-pipe, of a device for injecting a volatile liquid, such as anhydrous ammonia, into said pipe, a supply-pipe leading to the injecting device, and a valve arranged in the supply-pipe and comprising a casing having inlet and discharge passages separated by a partition provided with a port, a rotary disk having a plurality of feed-openings either one of which is adapted to be brought into coincidence with the port by turning the disk, a dial having a hand or pointer operatively connected with the disk, and means for turning the disk from the exterior of the casing.

13. In a refrigerating or ice-making apparatus, the combination, with a compressor-cylinder and its suction-pipe, of a device for injecting a volatile liquid, such as anhydrous ammonia, into said pipe, a supply-pipe leading to the injecting device, and a valve arranged in the supply-pipe and comprising a casing having inlet and discharge passages separated by a partition provided with duplicate seats each having a port, a plug-valve controlling the port in the seat on the discharge side, a rotary feed-disk mounted on the plug-valve and provided with a plurality of graduated feed-openings either one of which is adapted to be brought into coincidence with the port in the seat on the inlet side, and means for operating the plug-valve from the exterior of the casing.

14. In a refrigerating or ice-making apparatus, the combination, with a compressor-cylinder and its suction-pipe, of a device for injecting a volatile liquid, such as anhydrous ammonia, into said pipe, a supply-pipe leading to the injecting device, and a valve arranged in the supply-pipe and comprising a casing having inlet and discharge passages separated by a partition provided with duplicate seats each having a port, a plug-valve controlling the port in the seat on the discharge side and having a threaded stem working in a threaded opening in the case, a rotary feed-disk mounted on the plug-valve and provided with a plurality of graduated feed-openings either one of which is adapted to be brought into coincidence with the port in the seat on the inlet side, and a slotted hub or collar, a pin on the valve having its ends working in the slots in the collar, a spring for pressing the disk against its seat, and means for operating the plug-valve from the exterior of the casing.

15. In a refrigerating or ice-making apparatus, the combination, with a compressor-cylinder and its suction-pipe, of a device for injecting a volatile liquid, such as anhydrous ammonia, into said pipe, a supply-pipe leading to the injecting device, and a valve arranged in the supply-pipe and comprising a casing having inlet and discharge passages separated by a partition provided with duplicate seats each having a port, a plug-valve controlling the port in the seat on the discharge side and having oppositely-projecting stems extending to the exterior, one of said stems being threaded to work in a threaded opening in the case, a rotary feed-disk mounted on the plug-valve and provided with a plurality of graduated feed-openings either one of which is adapted to be brought into coincidence with the port in the seat on the inlet side, operating means connected with the threaded stem of the plug-valve, and a dial having a hand or pointer connected with the other stem of said valve.

16. In a refrigerating or ice-making apparatus, the combination, with a compressor-cylinder and its suction-pipe, of a device for injecting a volatile liquid into said pipe, a supply-pipe leading to the injecting device, and a valve arranged in the supply-pipe and comprising a casing having inlet and discharge passages separated by a partition provided with duplicate seats each having a port, a plug-valve controlling the port in the seat on the discharge side, a rotary feed-disk mounted on the plug-valve and provided with graduated feed-openings either one of which is adapted to be brought into coincidence with the port in the seat on the inlet side, a clutch connection between the plug-valve and disk adapted to permit the former to have independent longitudinal movement but cause both to turn in unison, and means for operating the plug-valve from the exterior of the casing.

17. In a refrigerating or ice-making machine, the combination, with a volatile-liquid-supply pipe, of a feed-valve arranged in said pipe and comprising a casing having inlet and discharge passages separated by a chambered partition having duplicate ports in communication respectively with said chamber and inlet and discharge passages, and valves governing the ports, the valve controlling the port on the inlet side having graduated feed-openings either one of which is adapted to be brought into coincidence with said inlet-port.

18. In an ice-making or refrigerating apparatus, the combination, with a compressor and its suction-pipe, of a casing arranged in said pipe, said casing having a deflector and an inlet leading thereto, one of said parts being removable for access to the casing.

19. In a refrigerating or ice-making apparatus, the combination, with a compressor, expansion-coils, and a suction-pipe leading from the expansion-coils to the suction-port of the compressor, of a device for injecting a volatile liquid into said pipe, and a valve governing the supply of liquid to the injecting device and having a plurality of graduated feed-openings, whereby the feed of the volatile liquid to said injecting device may be controlled in definite proportions according to the state of density of the gas or vapor passing through the pipe.

20. In a refrigerating or ice making apparatus, the combination, with a compressor, expansion-coils, and a suction-pipe leading from the expansion-coils to the suction-port of the compressor, of a device for injecting a volatile liquid into said pipe, and a valve governing the supply of liquid to said device and having a plurality of feed-openings, a dial, and a pointer turning therewith and traversing the dial.

21. In a refrigerating or ice-making apparatus, the combination, with a compressor, expansion-coils, and a suction-pipe leading from the coils to the compressor, of a device for injecting a volatile liquid into said pipe, and a valve governing the supply of liquid to the injecting device and having a plurality of graduated feed-openings, and means for indicating when the desired opening is brought into feeding position.

22. In a refrigerating or ice-making apparatus, the combination, with a volatile-liquid-supply pipe, of a feed-valve therein having a plurality of graduated feed-openings, and means for indicating when the desired opening is brought into feeding position.

23. In an ice-making or refrigerating apparatus, the combination, with a volatile-liquid-supply pipe, of a feed-valve therein comprising a casing having inlet and discharge passages separated by a chambered partition having duplicate ports in communication respectively with said chamber and inlet and discharge passages, a plug-valve controlling the port in the seat on the discharge side, a rotary feed-disk controlling the port in the seat on the inlet side and having a plurality of graduated feed-openings, means for operating said valve and disk, and means for indicating the extent of movement of the disk to bring either one of its openings into register with said inlet-port.

24. In a refrigerating or ice-making apparatus, the combination, with a compressor-cylinder and its suction-pipe, of a casing removably applied in said pipe and having a deflector and an expansion-chamber in communication with its discharge-port through ports in the deflector, an injecting device located at or near the top of said deflector and in said expansion-chamber, a supply-pipe leading through the wall of the casing to the injecting device, and a valve in said supply-pipe.

In testimony whereof I affix my signature in presence of two witnesses.

GEORGE B. HIETT. [L. S.]

Witnesses:
GLADYS L. THOMPSON,
GENEVIEVE MATTHEWS.